M. ARNAVAS.
VEHICLE WHEEL.
APPLICATION FILED SEPT. 28, 1917.

1,271,414.

Patented July 2, 1918.
2 SHEETS—SHEET 1.

Witness
Paul W. Hunt
F. Hough

Inventor
Mario Arnavas
By Victor J. Evans.
Attorney

M. ARNAVAS.
VEHICLE WHEEL.
APPLICATION FILED SEPT. 28, 1917.
1,271,414.
Patented July 2, 1918.
2 SHEETS—SHEET 2.
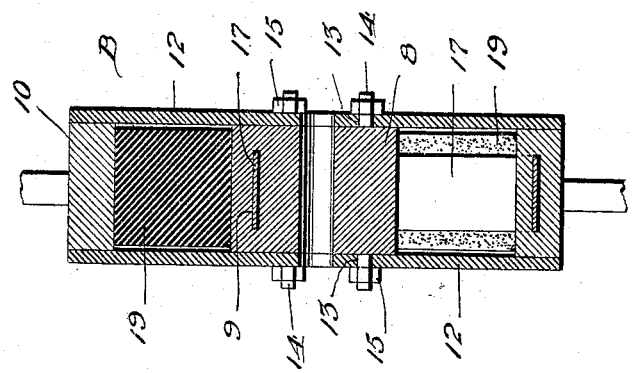
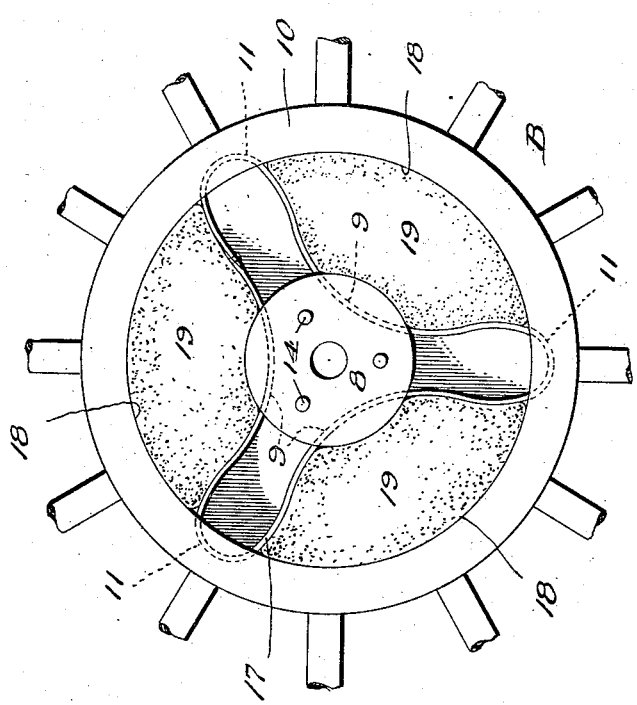
Witness
Paul M. Hunt
F. Hough
Inventor
Mario Arnavas
By Victor J. Evans
Attorney

UNITED STATES PATENT OFFICE.

MARIO ARNAVAS, OF SAN FRANCISCO, CALIFORNIA.

VEHICLE-WHEEL.

1,271,414.

Specification of Letters Patent.

Patented July 2, 1918.

Application filed September 28, 1917. Serial No. 193,799.

*To all whom it may concern:*

Be it known that I, MARIO ARNAVAS, a citizen of Kingdom of Italy, residing at San Francisco, in the county of San Francisco and State of California, have invented new and useful Improvements in Vehicle-Wheels, of which the following is a specification.

This invention relates to a vehicle wheel which is of the resilient type and is primarily intended for use upon motor vehicles.

The primary object of the invention is to provide a vehicle wheel wherein the construction of the hub of the wheel is such that it may be employed to absorb the shocks and jars incident to the travel of the wheel over an uneven surface.

Another object of the invention is to so construct the hub of the wheel that the section comprising the same may be connected by a resilient lacing which also serves to maintain in spaced relation a plurality of cushions by means of which the hub sections are maintained in spaced relation.

With these and other objects in view, the invention resides in the novel combination and arrangement of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications within the scope of the claim may be resorted to when desired.

In the drawings:

Fig. 2 is an enlarged elevation of the hub of a wheel from which one of the covered rings has been removed.

Fig. 3 is an enlarged transverse section on the line 3—3 of Fig. 1.

Like characters of reference denote corresponding parts throughout the several views in the drawings.

Figure 1:
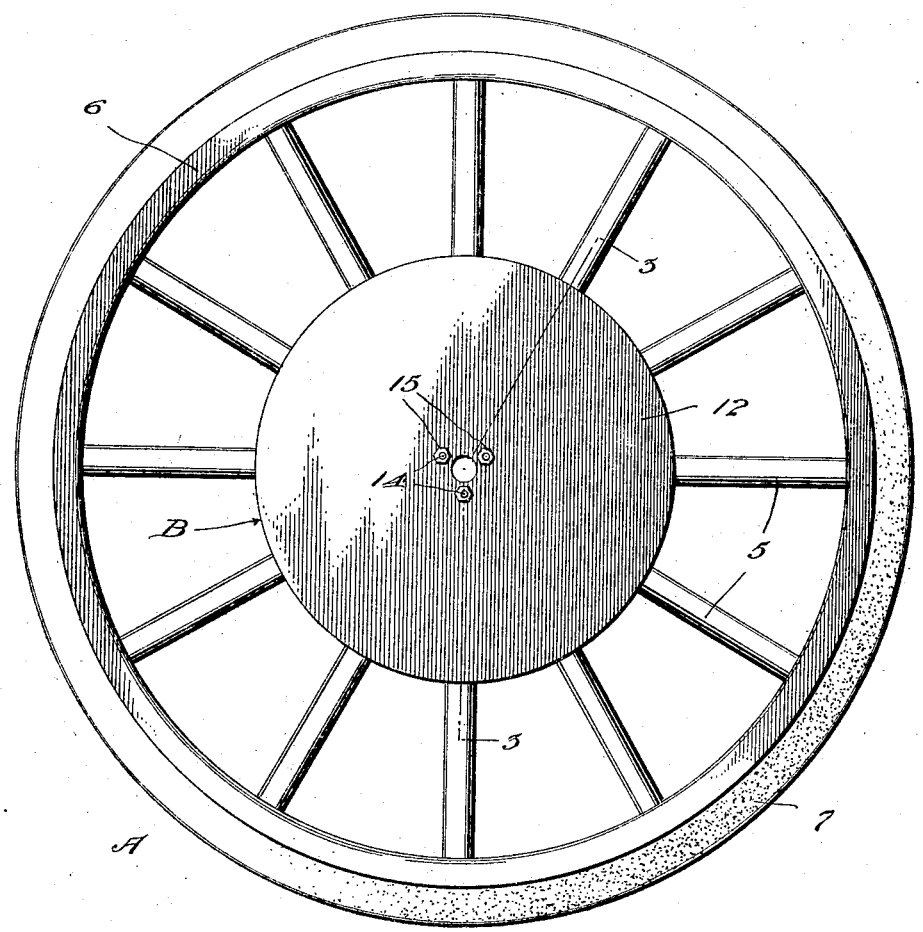
Figure 1 is a view in side elevation of a vehicle wheel constructed in accordance with the invention.

Referring now to the drawings in detail, the letter A designates a vehicle wheel constructed in accordance with the invention wherein the hub B of the wheel has radiating therefrom spokes 5 engaged with the channeled felly 6 upon which is mounted a resilient tire 7.

The hub B includes an axle boxing 8 of cylindrical shape which is slotted between its ends to provide a plurality of arcuate shape eyes 9. Arranged circumferentially of the boxing 8 is a band 10 which constitutes the outer section of the hub B and has its inner face slotted to provide the band with a plurality of arcuate shape eyes 11. The band 10 is held against lateral movement with relation to the boxing 8 by a pair of rings 12 which extend beyond the band 10 and have formed therein openings 13 through which are passed stems 14 at the ends of the boxing 8. The stems 14 extend beyond the rings 12 and have mounted thereon nuts 15 by means of which the rings are forced firmly against the ends of the boxing 8 and retained upon the stems. The band 10 and boxing 8 may be formed from any material suitable for the purpose, although if these members are formed from molded material the eyes can be more easily formed therein than is the case where the band and boxing are formed of wood.

The lacing 16 which in this instance has been shown as a resilient metallic strip is threaded through the eyes 9 and 11 in the hub sections to form a plurality of loops 17 which not only serve to connect the hub sections but divide the space therebetween into compartments 18.

Arranged within each of the compartments 18 is a resilient segment shape cushion 19 which serves to maintain the band 10 and the boxing 8 in spaced relation, said cushions being spaced from each other by the arms of the loops 17.

From the foregoing description taken in connection with the accompanying drawings it is apparent that a durable and inexpensive vehicle wheel has been provided wherein the hub is so constructed that it serves to absorb shocks and jars when the wheel is traveling over an uneven surface.

Having thus described the invention, what is claimed as new is:—

In a vehicle wheel, a band having arcuate eyes therein the terminals of which open out through the inner peripheral face of the band, an axle boxing within said band having arcuate eyes therein the terminals of which open out through the outer peripheral face of the boxing, cushions interposed between the eyes in said band bearing upon the outer peripheral face of said boxing above the eyes therein, a continuous lacing threaded through the eyes in said band and boxing contacting with the ends of said cushions, and rings coextensive in diameter with said band detachably mounted on the ends of said boxing.

In testimony whereof I affix my signature.

MARIO ARNAVAS.

Copies of this patent may be obtained for five cents each, by addressing the "Commissioner of Patents, Washington, D. C."